*INVENTOR.*
JAMES F. OLESON
BY
*R. E. Geaugue*
ATTORNEY

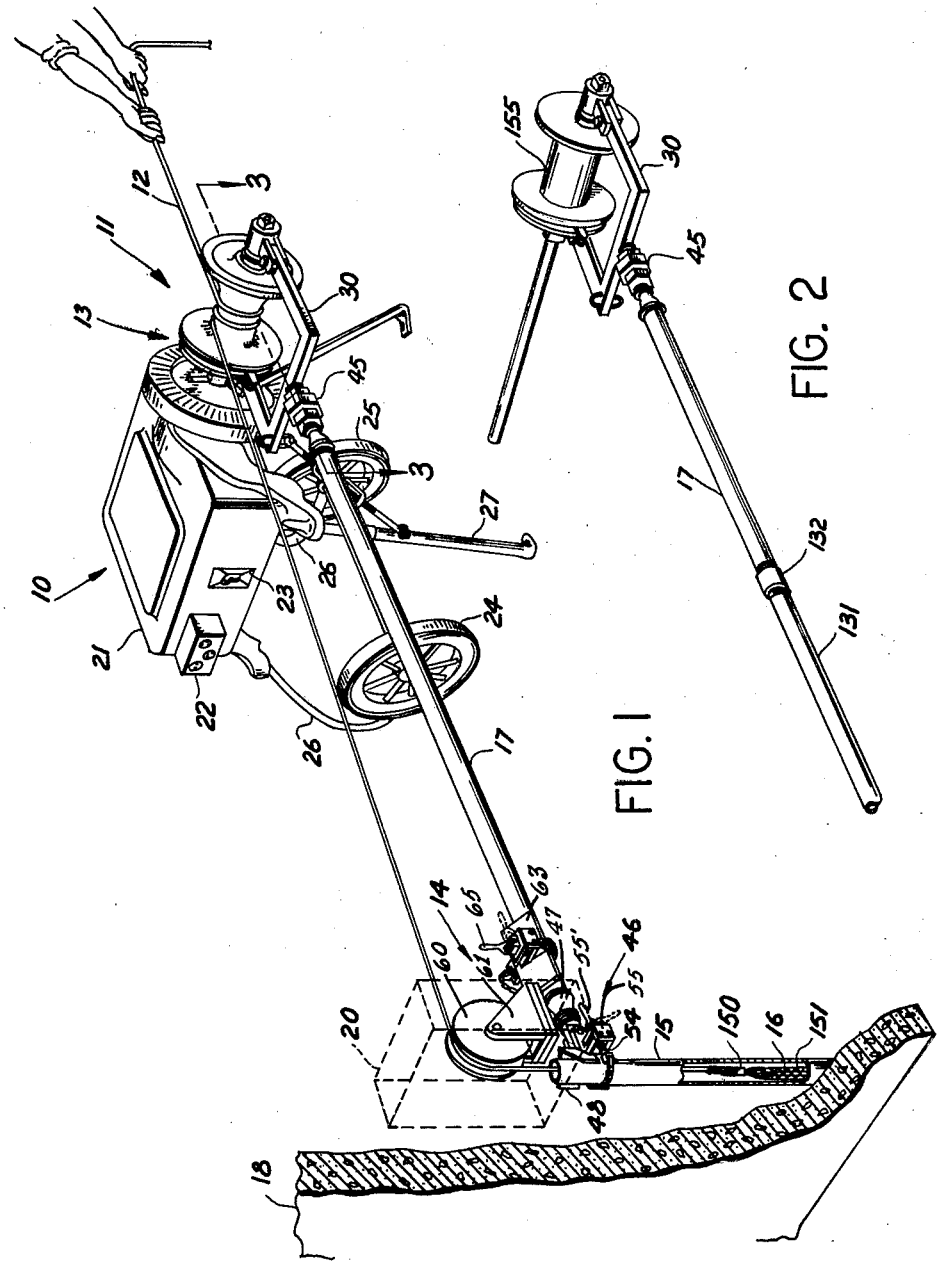

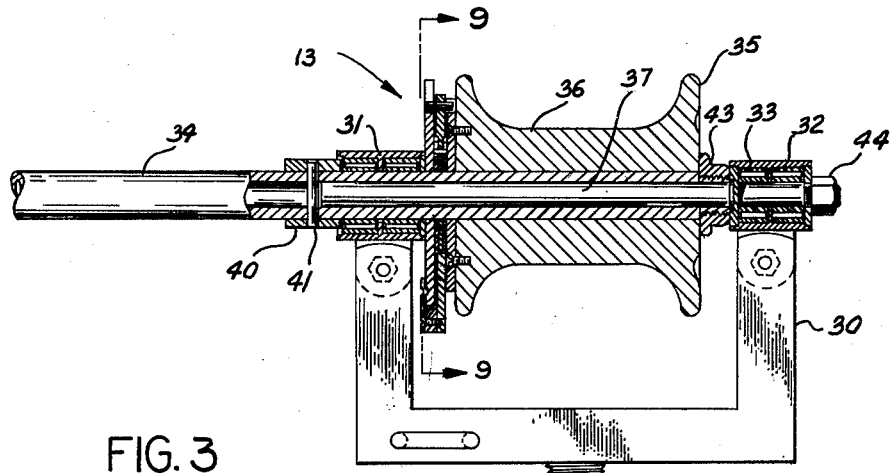
FIG. 3
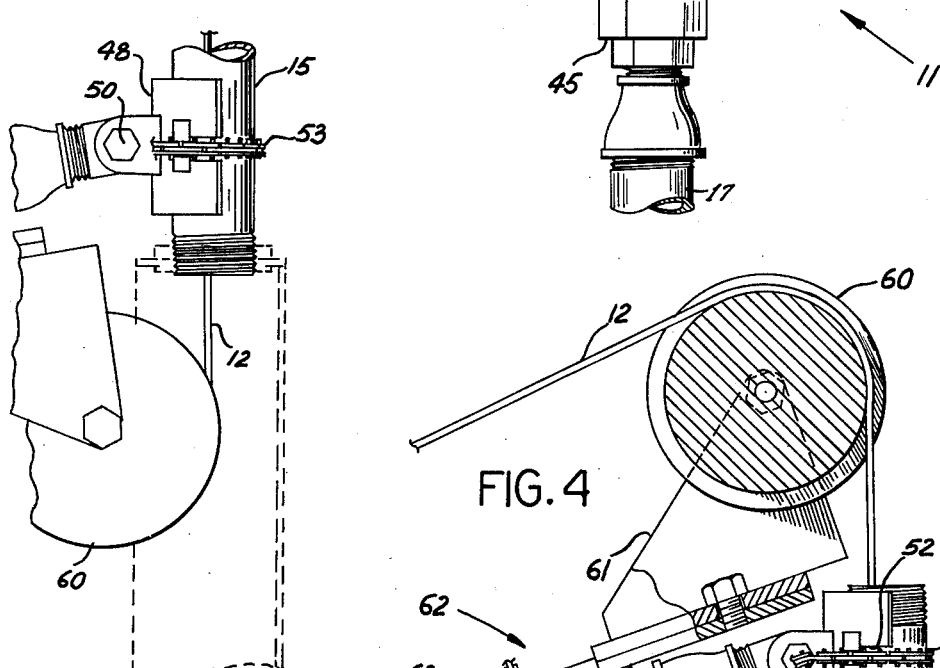
FIG. 4
FIG. 5
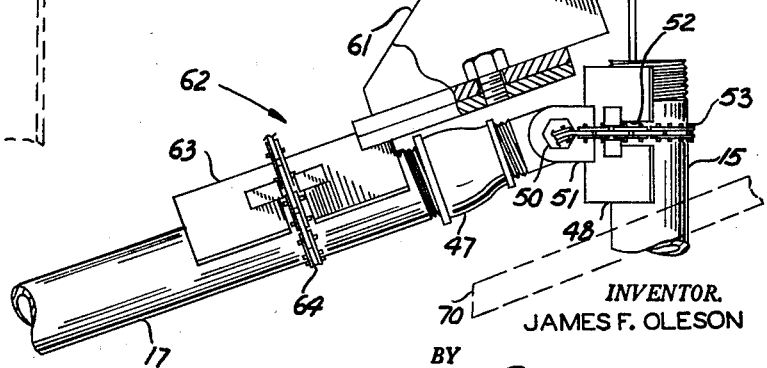
INVENTOR.
JAMES F. OLESON
BY
R. E. Geangue
ATTORNEY

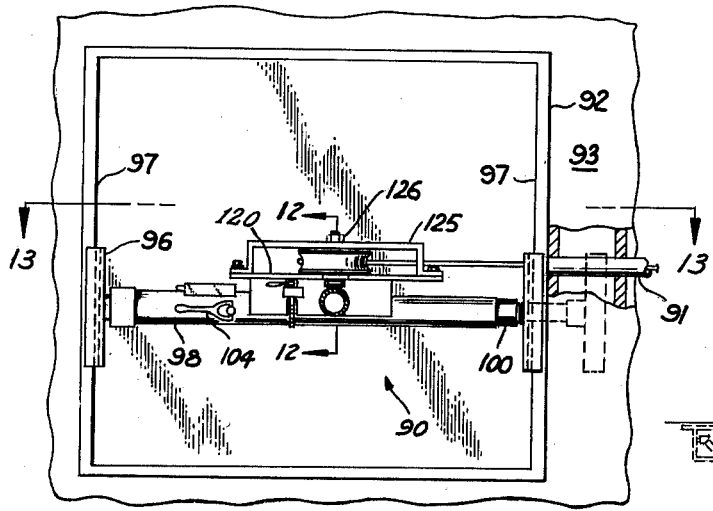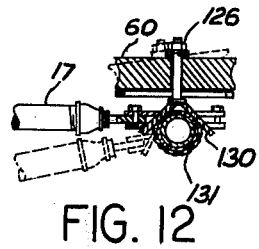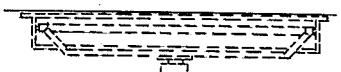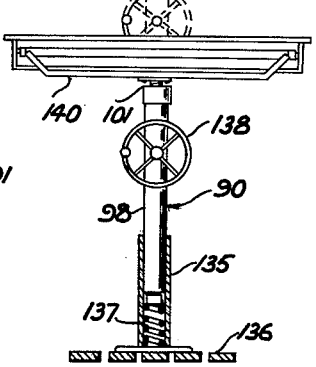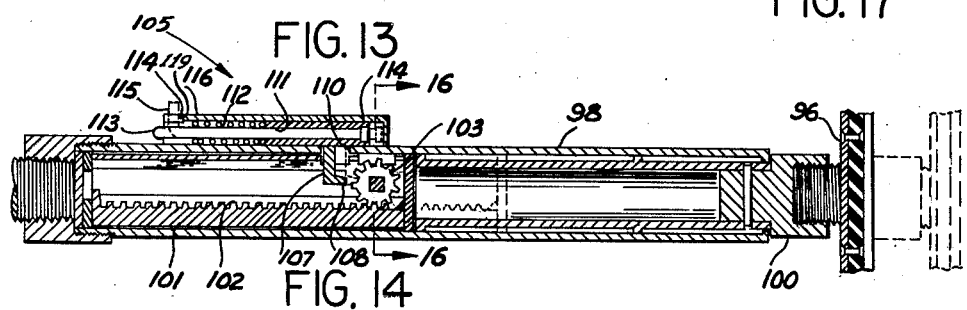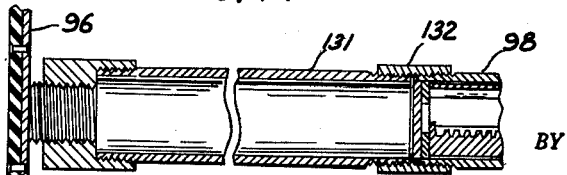

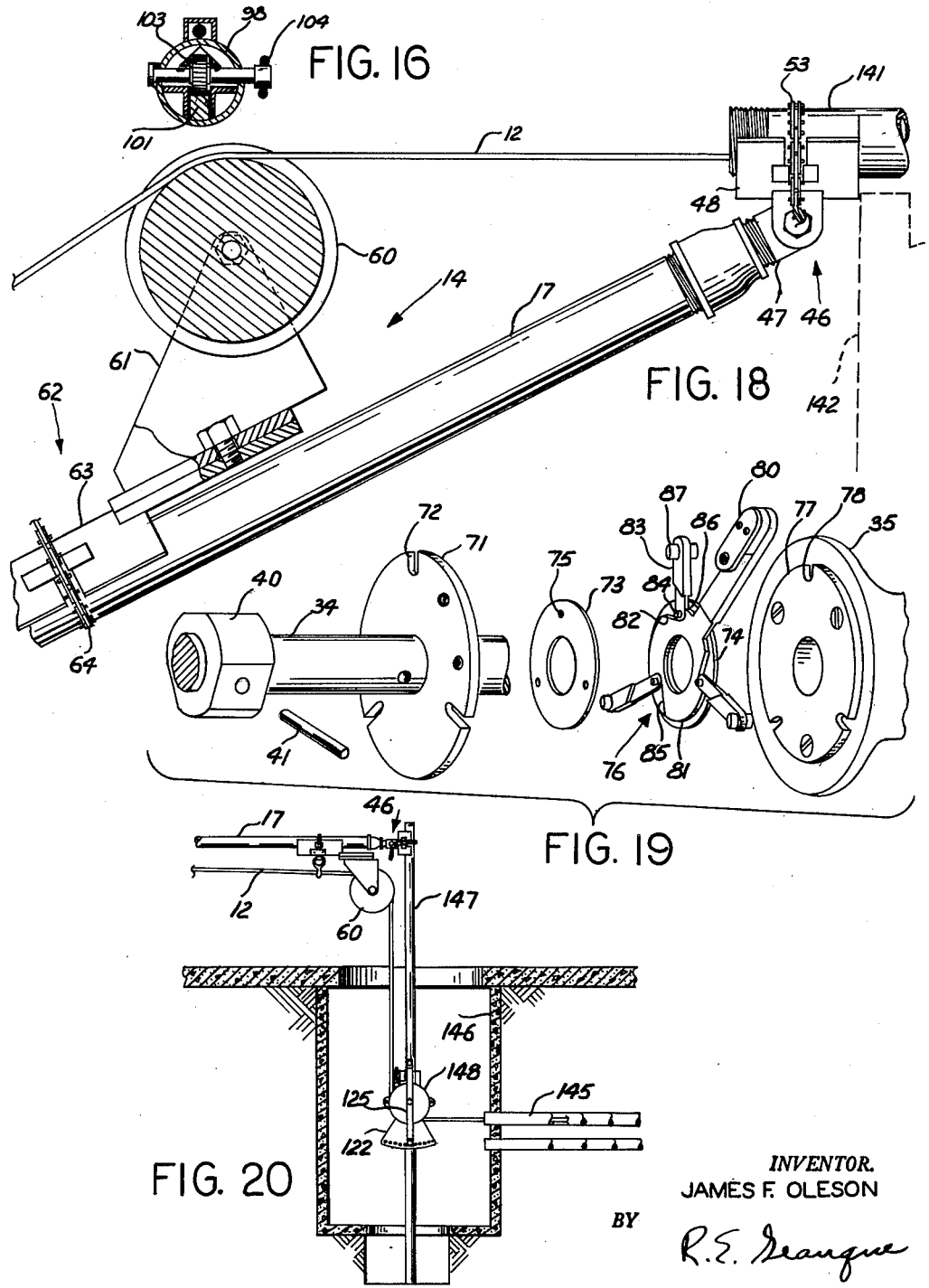

United States Patent Office 3,190,616
Patented June 22, 1965

3,190,616
CABLE THREADING APPARATUS
James F. Oleson, 4120 Lincoln Blvd., Venice, Calif.
Continuation of application Ser. No. 97,385, Mar. 21, 1961. This application Oct. 11, 1963, Ser. No. 316,793
9 Claims. (Cl. 254—134.3)

This application is a continuation of copending application Serial Number 97,385, filed March 21, 1961, entitled Cable Threading Apparatus, now abandoned.

This invention relates to apparatus for threading or pulling wire bundles, or the like, through a conduit or rigid tubing and more particularly, to apparatus readily adaptable to power drive or pull the wire bundle through a conduit wherein the load forces generated are distributed into the conduit supporting structure.

In the building industry, it is the practice to provide rigid conduit or tubes for bundles of wires or so-called harnesses of electrical wires such as cable. It has always been a tedious, time-consuming, and therefore expensive operation to thread the wire bundles through the conduit or tubing. In many cases the bundles contain a large number of individual wires of considerable length, for example from thirty to three hundred fifty feet long or more which weigh about 3500 lbs. In order to facilitate the handling of the wires, the wires are sometimes tied together at spaced points throughout their length by cords or string, this tying operation requiring considerable time and patience. A pull wire or line is usually threaded through the conduit or tubing and one end thereof is then attached to the end of the harness or bundle of electrical wires and the pull wire is employed to assist in pulling or threading the bundle through the tubing. The bundle closely fits the tubing and generally two or three men are needed to laboriously work the bundle through the tubing. In practice, many man hours are expended in slowly working or threading the bundle through the conduit or tubing.

At all times during the process or operation above described, caution must be exercised in order to keep the tubing and the bundle or assembly of wires from kinking. It is often a requirement that the wires fit closely within the protective tubing and this close fit necessitates the utilization of additional manpower in order to process the wires or cable through the conduit or tubing.

When the cable or wire bundles are manually drawn or threaded through the conduit, the load forces generated by the weight of the cable and the frictional forces encountered between the outer surface of the cable and the inner surface of the conduit are transmitted and distributed through the men pulling the cable or harness into the ground or whatever supporting structure they may be standing upon. Likewise, when power equipment is employed, load forces are similarly distributed through the structure on which the powering equipment rests. However, when either manual means or conventional power equipment is employed, a load force vector component is derived which is generally angular to the direction of the cable pull with the resultant requirement for additional manpower or increased primary power equipment.

Furthermore, it has been difficult to thread or draw cable through a conduit due to the fact that the exposed end of the tube or conduit may terminate in a relatively confined area such as an electrical terminal junction box, may project through a roof of a building or project into a subterranean cavity or in many instances, the end of the conduit may remain flush with a wall of the junction box or other building or terrestrial installation. In those instances where the open end of the conduit is flushed with its supporting structure, it is extremely difficult to assemble cable threading equipment such that the load forces encountered when drawing the cable through the conduit will be transferred into the supporting structure for the conduit in a direction substantially parallel to the direction of the pull. This problem also exists even when a portion of the terminal end of the conduit is exposed and is readily accessible for attachment of power pulling equipment.

Therefore, it has been found highly desirable to provide an apparatus for power threading cable, wire bundles, harness or the like, through a conduit or rigid tubing and for dispersing the load forces encountered in the operation of drawing the cable therethrough into the conduit supporting structure in instances where the terminal opening end of the conduit is flush with the supporting structure or wherein the terminal end of the conduit projects beyond the supporting structure. When the terminal opening end of the conduit is flush or beneath its supporting structure, it may be rendered relatively inaccessible because of the surrounding structure and the need has existed, therefore, for providing a universal cable threading apparatus which will overcome this difficulty as well as the other above mentioned difficulties.

In accordance with the present invention, a cable threading apparatus is provided which is readily adaptable to engage the projected or extended conduit terminal end so that as the cable is drawn through the conduit, the load forces encountered are distributed through the conduit to its supporting structure. The present invention also provides an adapter which is readily mountable in a conventional junction box in instances where the opening of the conduit is relatively flushed and not accessible for direct contact or attachment of the apparatus so that the load forces encountered in drawing the cable through the conduit will be distributed through the terminal box and into its supporting structure. The adapter may also be extended or retracted to fit various size terminal boxes. Such an adapter is susceptible for independent use as a lifting device for raising and lowering articles above a supporting surface.

Another feature of the present invention resides in the fact that the adapter includes means for maintaining a straight line alignment between the cable drawing apparatus and the conduit so that the pull wire or line to which the cable is attached will not rub or encounter the relatively rough edges of the terminal end of the conduit.

Still another object of the present invention is to provide a universal cable threading apparatus which is of unitary design and which may be readily positioned and coupled to a conduit which may terminate through a roof of a building in a vertical direction, project from the wall of the building in a horizontal direction, or terminate beneath the ground in a subterranean cavity or hole. In all of these examples and applications, the present invention provides a means readily engageable with the conduit or its supporting structure for transmitting and distributing the load forces encountered during the threading operation so that these forces may be dissipated through surrounding supporting structure.

Another object of the present invention is to provide an operational method and apparatus than can be performed in full by one operator without a great amount of skill or training.

A still further object of the present invention is to provide a machine that is time saving over the process heretofore used. In actual operation, one man, by employing the apparatus of this invention, may readily thread a bundle or assembly of wires through a rigid tube or conduit in approximately two to five minutes whereas, heretofore, two or more men were required and from one to two hours were needed to manually perform the same identical threading operation.

A still further object of this invention is to provide a machine of the kind mentioned that is practical and easy to operate. The machine is simple in its operation and has relatively few points of possible malfunction. There are few adjustments necessary in the operation and those found necessary do not require the exercising of a great amount of technical skill or ability.

Still a further object of the present invention is to provide a novel cable threading apparatus which includes a power means for pulling a considerable length of cable through a rigid conduit. The power means includes a novel clutch mechanism which is readily engaged and disengaged by a simple manually operated handle.

Still another object of the present invention is to provide a novel clamping means for affixing the various assemblies of the cable threading apparatus onto major support objects such as a conduit through which the cable is being threaded or various extensions and support members of the apparatus itself.

These and other objects will be more readily apparent upon a reading of the following description and with reference to the accompanying drawings, in which FIGURE 1 is a perspective view of a cable threading apparatus in accordance with the present invention shown in a typical cable threading or pulling operation in conjunction with an electrical terminal box installed in a building wall;

FIGURE 2 is a perspective view of a portion of the cable threading apparatus of FIGURE 1 incorporating a modified extension member therefor;

FIGURE 3 is a sectional view of a capstan assembly including a clutch mechanism employed in the apparatus of FIGURE 1 taken in the direction of arrows 3—3;

FIGURE 4 is a side elevational view of the cable threading apparatus of FIGURE 1 employed in conjunction with a conduit projecting through a building roof;

FIGURE 5 is a side elevational view of a portion of the apparatus of FIGURE 1 employed in conjunction with a conduit opening downwardly into a terminal junction box;

FIGURE 11 is a cross-elevational view of an adapter for mounting the friction pulley and its clamping means to the inside edges of a terminal junction box when the conduit is flush with a box wall or recessed from the box interior;

FIGURE 12 is a sectional view of the friction pulley and its clamping means taken in the direction of arrows 12—12 of FIGURE 11 and illustrating, in broken lines, its adaptation for vertical angularity;

FIGURE 13 is a top view of the friction pulley and adapter of FIGURE 11 taken in the direction of arrows 13—13 showing means for adjusting the pulley to provide proper alignment with the conduit opening;

FIGURE 14 is an enlarged sectional view of the adapter and its means for the extension thereof taken in the direction of arrows 14—14 of FIGURE 13;

FIGURE 15 is a sectional view of an extension member of fixed length suitable for coupling with the adapter of FIGURE 14 or the elongated member of FIGURE 2;

FIGURE 16 is a sectional view of the rack and pinion means for extending and retracting the length of the adapter taken in the direction of arrows 16—16 of FIGURE 14;

FIGURE 17 is a side elevational view of the adapter of FIGURE 14 employed for vertically lifting articles shown mounted in a spring bias damper illustrated in section;

FIGURE 18 is a side elevational view of the friction pulley and its clamping means as well as the extension member and its clamping means coupled to a conduit so that cable may be drawn horizontally therethrough;

FIGURE 19 is an exploded assembly view of the clutch mechanism including the driving and driven members incorporated in the apparatus of FIGURES 1 and 3; and FIGURE 20 is a side elevational view of the cable threading or pulling apparatus incorporated in an application for drawing cable through a conduit terminating within a subterranean cavity or hole.

Figure 7:
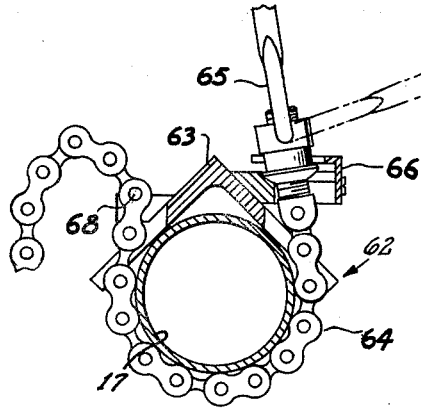
FIGURE 7 is a side elevational view, partially in section, of the clamping means shown in FIGURE 6 taken in the direction of arrow 7—7.

With reference to FIGURE 1, a cable threading or pulling apparatus is shown in accordance with the present invention which includes a mobile power unit 10, a capstan assembly 11 for receiving and winding a pull wire or line 12, clutch mechanism 13 detachably coupling the power unit to the capstan assembly 11, a pull wire or line friction pulley assembly 14 connectable to a rigid conduit 15 through which a cable wire or bundle 16 is threaded and a straight thrust extension member 17 rigidly coupling the capstan assembly to the friction pulley assembly. The conduit 15 is shown suitably installed in a portion of a wall 18 having built therein or adapted to receive an electrical terminal junction box 20. In the present illustration of FIGURE 1, the extreme terminal end of the conduit 15 is free from surrounding supporting structure and it is exposed for ready attachment of the cable threading apparatus.

Power unit 10 includes an electrical motor (not shown) of suitable horsepower enclosed by a housing 21 having a socket box 22, for receiving an electrical supply cord and an on/off switch 23. The unit is supported on a movable carriage including wheels 24 and 25 and braces 26. Extendable rigid legs, such as leg 27, are detachably connected to the power unit for supporting the unit in conjunction with the wheel carriage during operation of the cable threading apparatus.

The capstan assembly 11, as seen more clearly in FIGURE 3, includes a U-shaped yoke 30 which mounts a pair of bearing carrying fixtures 31 and 32. Each fixture carries a pair of roller bearings such as bearing 33 for example. A hollow driveshaft 34 is operatively connected to the power unit and extends from the power unit through a pair of roller bearings associated with fixture 31. Mounted on the extreme cantilevered end of the driveshaft, there is rotatably carried, a capstan head 35 having a winding surface 36 about which the pull wire 12 is wound. A rod 37 is inserted through the roller bearings associated with fixture 32 and received into the hollow bore of the driveshaft. Thereby, it is seen that driveshaft 34 rotates within bearings carried by fixture 31 and that rod 37 rotates within the bearings carried by fixture 32.

Figure 10:
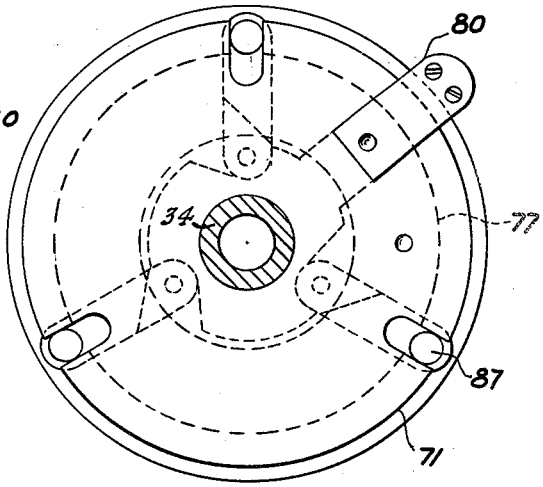
FIGURE 10 is an enlarged sectional view of the clutch mechanism in its disengaged position as employed in the capstan assembly of FIGURE 3.
Figure 9:
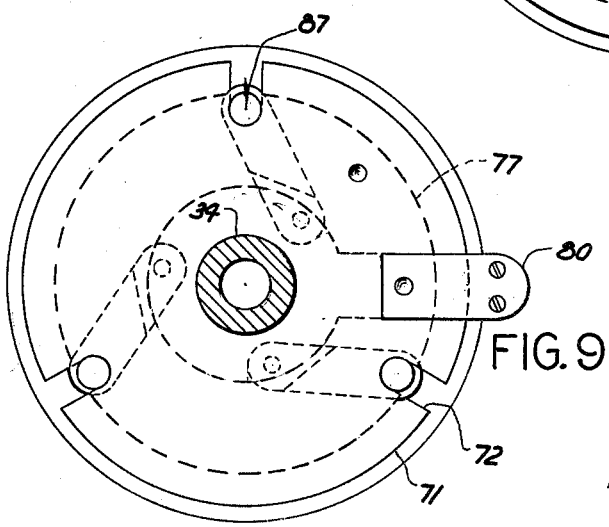
FIGURE 9 is an enlarged sectional view of the clutch mechanism in its engaged position as employed in the capstan assembly taken in the direction of arrows 9—9 of FIGURE 3.

The clutch mechanism 13, to be described in more detail later with respect to FIGURES 9, 10 and 19, is disposed between the fixture 31 and the inboard end of the capstan head and is employed to impart rotary movement to the capstan head from the power unit via the driveshaft when the clutch is engaged.

A collar 40, FIGURE 3, and its associated pin 41 serve as a stop means for the capstan assembly so that the assembly is prevented from sliding on the driveshaft. Pin 41 is received through mated holes in the collar 40 and driveshaft 34 so that the collar remains fixed to the driveshaft and rotates therewith. The outboard end of the capstan head abuts a stop nut 43 which is threadably engaged with the outboard end of the driveshaft 34. In this fashion, the capstan head, clutch mechanism and fixture 31 with its associated bearings are maintained in a fixed position between stop collar 40 and stop nut 43. Rod 37 is maintained within the hollow bore of driveshaft 34 by means of a stop nut 44 threadably engaged with the end of rod 37 which when run down the threaded end of rod 37 abuts fixture 32 and its associated bearings.

As shown in FIGURES 1 and 3, the yoke 30 of the capstan assembly is detachably secured to one end of rigid extension member 17 by means of a suitable coupling arrangement 45. The opposite end of thrust member 17 is provided with a clamping means 46 for detachably coupling member 17 to the exposed free end of conduit 15. Although a cable threading apparatus of the present invention as shown in FIGURES 4 and 5 are for a different application than that as shown in FIGURE 1, the details of construction for the clamping means is identical and, therefore, reference is now made to FIGURES 4 and 5 as well as FIGURE 1. The end of member 17 opposite to its end carrying coupling 45, is provided with a coupling 47 having attached thereto a V-shaped channel 48 by means of a pivot bolt 50, FIGS. 4 and 5, which passes through a pair of flanges 51 carried on the V-shaped channel 48 and the coupling 47. Channel 48 is constructed to receive the conduit 15 within the V-shaped space. Member or channel 48 is also provided with a pair of guide notches separated by the V-shaped space to permit a chain 53 to be wrapped around conduit 15 so that the conduit is encircled by the chain in conjunction with the channel section 48. One end of the chain 53 is anchored to the pivot bolt 50 while the opposite end of the chain is attached to a threaded member 54, as shown in FIGURE 1, which is rotatably anchored in turn in a fixture 55 carried on the channel member 48. Pivotally secured to the opposite end of the rotatable threaded member 54 from its end to which the chain is anchored, there is provided a pivotal handle 55', FIG. 1, so that the member may be conveniently rotated in its fixture 55 to either tighten or loosen the chain about the conduit 15.

Figure 6:
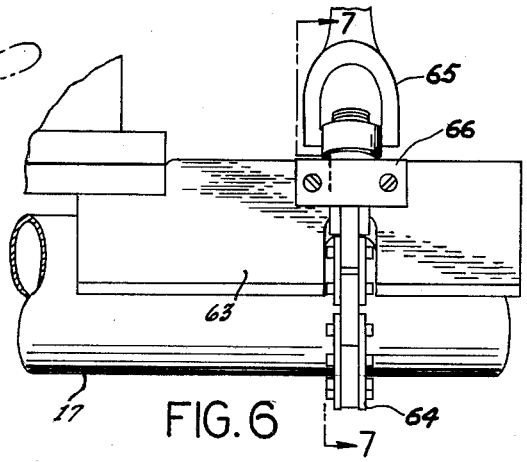
FIGURE 6 is an enlarged view of the clamping means for the friction pulley assembly employed in the apparatus of FIGURES 1 and 4.
Figure 8:
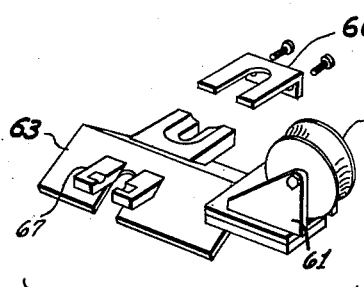
FIGURE 8 is an exploded assembly view of the frictional pulley assembled employed in FIGURE 6.

A feature of the present invention resides in the fact that the pull wire by which the cable is theaded through the tubing or conduit is forcibly pulled or urged in a direction substantially parallel and in alignment with the open end of the conduit so that the pull wire never scrapes or engages the relatively sharp edges of the end of the conduit. To provide such an advantageous feature, the cable threading apparatus of the present invention includes a pulley 60 about which the pull wire 12 passes. The pulley is rotatably mounted on a yoke-like base 61 which in turn is attached to a clamping means substantially similar to the clamping means 46. In this instance, a clamping means 62 is provided which includes a channel V-shaped member 63 which receives a portion of member 17 and a chain 64 which passes around both channel 63 and extension 17 as shown in FIGURES 4, 6 and 7. FIGURE 7 more clearly shows a rotatable handle 65 attached to one end of chain 64. The handle 65 is suitably anchored in a detachable clamp 66 cooperating with the channel 63. A suitable clamp is employed as shown in the exploded assembly drawing of FIGURE 8. A link of chain 64 is provided with a pin 68 which when chain 64 is suitably tightened about conduit 15 is anchored or nested into a cooperative receptacle 67 carried on the channel 63 opposite to the side of the channel carrying clamp 66.

Although FIGURE 1 shows the cable threading apparatus of the present invention coupled to the conduit 15 which is readily available with respect to the terminal box 20 and the wall construction 18 for attachment purposes, it is to be understood that the present invention may also be employed when the opening end of the conduit is available only in remote or awkward locations such as that shown in FIGURE 4 whereby the conduit terminal end 15 projects through a roof 70. It is to be noted that in such an application, the member 17 is pivoted with respect to the clamping means 46 so that the clamping means 62 for the pulley assembly may be suitably positioned over the open end of the conduit to provide a straight pull parallel to the conduit for the pull wire 12. Furthermore, with respect to FIGURE 5, the adaptability and flexibility of the cable threading apparatus of the present invention is shown whereby the apparatus may be employed for coupling or connection with a conduit 15 having its open end terminating downwardly as opposed to the upward termination as shown in FIGURES 1 and 4. For such an installation as shown in FIGURE 5, the pulley assembly clamping means 63 is fastened in such a manner to member 17 that the pulley wheel 60 is below the extension member so that the pulley wheel 60 may properly permit the parallel alignment with the pull wire 12 respective to conduit 15.

The clutch mechanism 13 as shown in the exploded view of FIGURE 19 is mounted about the driveshaft 34 and may be said to comprise a drive clutch plate 71 arranged to rotate with the shaft 34 which includes a plurality of elongated notches, such as notch 72, which open about the periphery of the plate 71, and operating means including a pair of baffles 73 and 74 having aligned holes 75, an operating mechanism 76 disposed between the baffles 73 and 74, and a driven clutch plate 77 secured to the inboard end of the capstan head 35. The driven clutch plate 77 includes a plurality of notches 78 opening to the periphery thereof; however, the notches 78 are not as deep or as far elongated as the notches 72 provided in plate 71 and the diameter of plate 77 is reduced as compared to the diameter of plate 71. The operating means disposed between the baffles 73 and 74 includes a handle 80 integrally formed with a disc 81 which has a plurality of cutout portions, such as cutout 82 in the periphery of the disc. Each cutout portion 82 receives an end of a pawl, such as pawl 83. The end of pawl 83 which seats in a cutout portion is provided with a pivot pin 84 which mates with the hole 75 provided in the baffle 73 and 74 respectively. The pins 84 provide a pivot pin for the pawls so that the pawls may selectively rotate within the confines of the cutout. Each cutout is defined by a flat portion 85 on one side of the pawl and a raised shoulder portion 86 on the opposite side of the pawl. Such an arrangement permits the plurality of pawls to rotate towards or away from shaft 34 which in effect reduces or increases the diameter of a circular path of travel for the extended or projecting ends of the pawls. When the handle 80 is rotated in a clockwise direction, its travel is arrested by its abutment with the respective shoulders 86 as shown in FIGURE 10 and the diameter of the circular path of travel for the projecting end of the pawls is increased. The opposite end of each pawl from its end rotatably mounted on pin 84, is provided with a clutch pin 87 which extends outwardly on opposite sides of each pawl. When the clutch mechanism of FIGURE 19 is fully assembled, the outwardly projecting end of clutch pin 87 is received into one of the notches 72 associated with clutch plate 71 as shown in FIGURE 10. In this manner, clutch plate 71 drives the operating mechanism at all times when the power motor is operating. However, when the lever 80 is moved clockwise from the position as shown in FIGURE 10, the plurality of pawls 83 is pivoted about their mounting pins 84 so that the diameter of a circle formed about the periphery of the projecting ends of the combined multiplicity of pawls is reduced as shown in FIGURE 9 whereby the projecting end of clutch pin 87 facing the capstan head is received in notches 78 of the driven clutch plate 77. Upon this occurrence, a direct drive between the driving clutch plate 71 and the driven clutch plate 77 is achieved so that the capstan head 35 is rotated via the driveshaft 34 by the power unit.

With respect to the clutch mechanism shown in FIGURES 9 and 10, it is to be noted with respect to FIG- URE 10 that the clutch is shown in its disengaged position with the handle 80 rotated counterclockwise so that each pawl is rotated to rest against its associated shoulder 86. In this position, each clutch pin 87 associated with a pawl is removed from the respective notches 78 associated with the driven clutch plate 77 while the opposite end of each clutch pin 87 is still interposed within a respective notch 72 associated with the driving plate 71. In this manner, driven clutch plate 77 and the capstan head are free to rotate on shaft 34 without engagement with the power motor.

When the operating handle 80 is positioned clockwise, the pawls 83 rest against the flat portions 82 of the cutouts which causes the clutch pins 87 to be drawn into the plurality of notches 78 of the driven clutch plate 77 as shown in FIGURE 9. Thereby, the driving clutch plate 71 causes the driven clutch plate 77 to rotate via the engagement of the clutch pins 87 in the respective notches 72 of plate 71 and notches 78 of plate 77.

Inasmuch as handle 80 rotates with the capstan assembly shaft, it should be noted that the power driven capstan assembly is operated under the control of the on-off switch 23 which must be turned off when it is desired to actuate the clutch mechanism to either position of engagement or disengagement. When so desired, it is only necessary to switch the driving unit or motor "off" so that all rotation of the capstan assembly as well as handle 80 ceases. Once the power to the motor, and thereby the capstan assembly, has terminated, handle 80 may be readily and manually actuated to perform its intended function of clutch engagement or disengagement.

During disengagement, the capstan assembly may be freely rotated on shaft 34 without being loaded by the non-operating motor. Such a provision permits the line 12 to be drawn or let out manually with the idling capstan unpowered.

With reference to FIGURE 11 an adapter in the general direction of arrow 90 is provided in conjunction with cable threading apparatus of the present invention for use in situations where the conduit or protective tubing for the wire bundle is not readily accessible for attachment by the clamping means associated with the end member 17. Such a situation is shown in FIGURE 11 wherein a conduit 91 terminates in the side wall of a terminal box 92 installed in a wall 93.

The electrical terminal junction box 92 as shown in FIGURES 11 and 13 is suitably installed within the building wall structure 93. The box is received within a mounting recess 94 and the vertical walls of the box are suitably supported adjacent structural member 95 included in the wall construction. The adapter 90 is disposed within the box and is provided on its extreme opposite ends with a pad assembly, such as assembly 96 which engaged with the edge marginal region 97 of the wall box. Each pad assembly is threadably engageable with one end of the adapter. The adapter includes a cylindrical body 98 which houses a telescoping member 100 and actuating means therefor for selectively moving the member in and out of the body so that the overall length of the adapter may be readily adjusted.

With respect to FIGURE 14, the interior of body 98 is shown which includes the member 100 fully drawn within the body as shown in solid lines and partially extended or telescoping from the body 98 as shown in broken lines. The means for advancing or retracting the member 100 to and from the body 98 includes a rack 101 having a plurality of inwardly facing teeth, such as tooth 102 which are arranged to mesh with the teeth of a pinion gear 103. The rack 101 is arranged to slide back and forth within the hollow body 98 responsive to rotation of the pinion gear 103. Pinion gear 103 is rotated manually by a handle 104. A retention and release mechanism indicated in the general direction of arrow 105 functions to permit or prohibit rotation of pinion 103 so that the rack and pinion may selectively position member 100 to a predetermined extended position and when this extended position has been reached, the retention means may be actuated to prevent rotation of pinion 103 so that member 100 is maintained and retained in the extended position. Such a means includes a finger 107 having a projecting tooth 108 engageable with the teeth of the pinion gear. The finger is projected through a hole or aperture 110 in the body and is fixed to a sliding member 111. Sliding member 111 is spring biased by compression spring 112 to urge the sliding member to the right so that tooth 108 engages or meshes with the teeth of pinion gear 103. However, a plunger member 113 passing through the coil spring 112 and the sliding member 111 may be urged to the left against the spring tension of spring 112 so that an enlarged end portion 114 on the plunger will pull the sliding member 111 against the spring tension and remove the tooth 108 from engagement with the pinion gear 103. The plunger may be rotated to either the left or right so that a bent extension 115 may be engaged with the outside portion of a housing 116 which retains the sliding member in a position to permit complete and free rotation of pinion 103. A notch 119 in the housing near the extension 115 is provided so that the spring tension of spring 112 will urge the plunger and the sliding member to the right. Upon this happening, the extension member 115 will be received within the notch or slot in the housing and the tooth 108 will be retained in meshed engagement with pinion gear 103 by virtue of the expansion of the compressed spring 112 against the sliding member 111 and the plunger 113.

FIGURES 11 and 13 also show a means for properly aligning the direction of pull for the pull wire 12 with respect to the opening of conduit 91. In some installations, the opening for the conduit is located at a position which is fairly deep within the terminal box and some means must be employed for compensating for the increased distance between the outer edge of the box to which the adapter is engaged and the opening of the conduit through which the pole wire 12 will be drawn. Such a means in the present invention for achieving this objective includes a base member 120 which mounts the pulley 60 so that the pulley will be pivoted about a connecting pivot bolt arrangement 121. On the end of base 120 opposite to its end which pivots about bolt 121, there is provided a fan-like member 122 having a plurality of holes, such as hole 123 provided therein for receiving a fastener 124. Bolts 121 and fastener 124 serve to mount a bracket 125 onto the base 110. Bracket 125 pivots about bolt 121 and has attached in the center thereof a fastener 126 which carries the pulley 60. Fastener 126 projects through an elongated notch 127 in a bracket 128 so that as bracket 125 is pivoted about fastener 121, the pulley 60 is carried therewith. Upon the proper positioning of reel 60 with respect to the conduit opening, as shown in broken lines in FIGURE 13, fastener 124 may be tightened to fixed bracket 125 by virtue of its mounting fasteners. It is noted that the power unit and the capstan assembly are connected to the adapter by means of member 17 and its attachment to bracket 128.

The coupling between the end of member 17 with the adapter 90 is shown more clearly in FIGURE 12 which shows the fastener 126 about which pulley 60 rotates as being carried on a V-shaped channel member 130. Member 130 receives the body 98 of the adapter and by means of a flexible chain 131 the member 130 is clamped to the adapter. The pulley 60 over which the pull wire travels can be elevated by loosening the chain 131 and positioning member 17 as shown in broken lines so that the pulley elevates its extreme end about which the pull wire 12 travels.

Thus, by employing the adapter as shown in FIGURES 11–14, the adapter may be selectively extended to fit any substantially parallel supporting members, such as the edges of the terminal junction box, and any load forces encountered in drawing the cable through the conduit will be distributed into the supporting structure. Furthermore, the apparatus is flexible and adaptable to operate regardless of the location of the conduit opening since the pulley 60 over which pole wire 12 travels can be adjusted for height as shown in FIGURE 12 or can be adjusted for depth as shown in FIGURE 13.

With respect to FIGURE 15, an extension member is shown which may be readily coupled to one end of the adapter 90. The extension includes a cylindrical tube 131 which is threaded externally on its opposite ends so that a pad assembly 96 may be threaded on one end while its opposite end is engaged with the end of the adapter body 98 by means of a connecting collar 132. Such an arrangement is also shown in the FIGURE 2 in connection with extending the rigid member 17.

FIGURE 16 is a cross-sectional view of the adapter showing the handle 104 for actuating the pinion gear 103 into the rectilinear movement of rack 101.

FIGURE 17 shows another application and usage for the adapter as shown in FIGURE 14 whereby the adapter 90 is received into a holder 135 which is suitably supported on a platform or the ground 136. Within the holder 135, there is provided a spring shock absorbing or damping means 137 on which the adapter 90 rests. It is to be noted that handwheel 138 replaces the manual handle 134 and is employed for advancing and retracting the member 101 from the main body 98 of the adapter.

In place of the pad assembly 96 which is carried on the end of the member 100, the adapter has attached thereto a carrier 140 which supports a variety of articles to be lifted. In the present illustration, carrier 140 is shown lifting a fluorescent fixture with light tubes attached. As shown in solid lines, the lifting apparatus is in its lowered or loading position and as shown in broken lines, the apparatus is elevated with its load. It should be noted that either end of the adapter may be received by holder 135 with its opposite end carrying the load.

With reference to FIGURE 18, another application of the present cable threading apparatus is shown whereby a conduit 141 is in a horizontal position with its opening end jutting or projecting past the front surface of a wall 142. Furthermore, conduit 141 is considerably elevated above the platform or supporting structure on which the power unit and the capstan assembly are mounted so that member 17 is at a considerable angle with respect to the conduit 141. However, clamping means 46 may be readily adjusted so that it is fastened about conduit 141 by means of chain 53. In order to properly align the pulley 60 with respect to the opening of conduit 14 so that pull wire 12 will not scrape or engage the edges thereof, clamping means 62 for the assembly 14 is properly adjusted to clamp about member 17 to provide correct alignment for the pull wire 12. Chain 64 is tightened for the clamping means 62 so that the pulley 60 is retained in position on member 17.

With respect to the application of the present invention as shown in the FIGURE 20, it is to be noted that the conduit through which the cable is to be drawn is a subterranean conduit 145 opening into a subterranean cavity 146 such as a manhole below street pavement. In this application, it is noted that the cable threading apparatus as shown in FIGURE 1 is employed with the pulley 60 suspended below the bar or member 17. However, since member 17 cannot be readily clamped to the end of conduit 145, a supplemental member 147 is employed to which clamping mean 46 is secured. Member 147 projects into the subterranean cavity and has coupled thereto the clamping means 130 as employed in the adapter application of FIGURES 11 and 13. This means includes the fan-like plate 122, a pulley wheel 148 similar to the pulley 60, and clamping means therefor such as chain 131 (not shown). In such an arrangement, the pull wire 12 is directed about first pulley 60 and followed by training about pulley 148 and therefrom into direct insertion through conduit 145. Inasmuch as the clamping means associated with wheel 148 is adjustable, pulley 148 may be stationed in any convenient location on supplemental member 147.

FIGURE 1 further illustrates a suitable means for attaching the free end of pull wire 12 to the wire bundle or cabling 16. Such a means includes a head 150 attached to the end of the pull wire by suitable means and wherein the head 150 includes attachment to a hollow webbing of interwoven metal or cloth strips 151. The end of the cable to be drawn through the conduit is inserted into the cylindrical interlaced webbing and the webbing is then pulled or elongated so that it is caused to shrink about the end of the cabling. In this manner, the more tension or pull that is applied to the webbing 151 will serve only to tighten the webbing about the cabling so that the cabling cannot become detached from the pull wire 12 even under conditions of extreme tension and pull.

An actual typical operation of the present invention will be described with respect to the cable threading apparatus shown in FIGURE 1. The power unit is properly disposed a convenient distance from the conduit 15 through which the wire bundles or cable 16 is to be drawn. The power unit is made immobile by the attachment of legs 27 so that the power unit is adequately supported on its supporting structure such as the pavement or ground. Member 17 is coupled via coupling 45 to the capstan assembly 11 and its opposite end is elevated so that the friction pulley assembly 14 in proper alignment with the opening of the conduit 15. Clamping means 47 is tightened so that the chain of the clamping means fastens the free end of member 17 to the conduit adjacent the terminal end thereof. In the event pulley wheel 60 is not in proper alignment with the opening of the conduit, clamping means 62 may be adjusted and the assembly slid on member 17 until properly aligned so that the pull wire 12 will not scrape the edges of the conduit.

After the pull wire 12 has been suitably threaded through the conduit, its free end carrying the webbing 151 is slipped over the end of the cable to be pulled and elongated so that the webbing shrinks about the end of the wire bundle or cable to provide a firm grip thereon. The pull wire 12 is trained over pulley wheel 60 and is wound about the capstan head of the capstan assembly 11. The opposite end of the pull wire is manually gripped and a manual tension is applied to the pull wire.

At this time, handle 80 of the clutch mechanism may be actuated into its position as shown in FIGURE 9 so that the driving plate 71 and the driven plate 77 attached to the capstan head are in engagement via the clutch pins 87. The electrical switch 23 may now be turned to its On position so that the motor of the power unit may be supplied with energy and started. Power from the motor is supplied to the capstan head via the driveshaft 34 and the clutch mechanism so that the capstan head rotates in accordance with the applied power. The pull wire 12 is loosely wrapped about the capstan head and depending upon the amount of manual tension applied thereto, is caused to wind about the capstan head. As the winding occurs, the pull wire is pulled from the capstan head so that the rotary movement of the capstan head is used to primarily draw or pull the pull wire through the conduit while the manual tension applied to pull wire 12 augments or controls the tension applied to pull wire 12.

All of the loading forces derived from friction between the cable or wire bundle and the inside surface of the conduit 15 as well as the weight of the cable or wire bundle is distributed and dissipated through the extension member 17 and the clamping means 46 to the conduit per se and into the supporting structure for the conduit. It is also to be observed that at all times, the straight and direct pull by the pull wire 12 is exerted on the cable being threaded through the conduit so that the edges of the conduit do not come into contact with the pull line.

Should it become advisable for the apparatus operator to momentarily stop the threading operation, all that is required is for the operator to loosen his hold or tension on the pull line 12 so that the capstan head will slip through the wound turns of pull wire about the capstan head. When the operator desires to continue the operation, his grip or hold applies greater tension to the pull wire 12 and the wire comes into gripping contact with the capstan head and is caused to wind about the head.

If the operator decides to manually draw the cable through the conduit, the motor and power unit 10 may be turned Off and the clutch mechanism may be actuated to its disengaged position.

In addition to the showing of an extension 131 in FIGURE 2, the capstan head has been removed from the assembly and replaced with a line or wire storage reel 155 about which the pull line may accumulate and wrap for storage.

Therefore, it can be seen from the above detailed description that the cable threading apparatus of the present invention provides a unique powered apparatus for the threading of cable through a conduit which is constructed of relatively few parts, extremely flexible to be used in a variety of applications, and which is easy to service and maintain as well as to adjustment for maximum efficiency and operation. The subject invention is extremely flexible and is universal in its design so that a plurality of attachments and adapters may be readily combined with the basic design or configuration to more readily expand the usefulness and efficiency of the threading apparatus. It is apparent that the present invention provides a cable threading apparatus which can be easily attached and operated by an average person without the use of complicated tools of any kind since the clamping means and the actuation of the clutch mechanism can be achieved with the simplest of hand operations. Various modifications may be contemplated by those skilled in the art without departing from the spirit and scope of the invention hereinafter defined in the appended claims.

I claim:

1. Apparatus for threading a bunched group of wires through a rigid conduit comprising;
    a pull line engaged in gripping relationship with one end of the group of wires for aligning the wires in substantially parallel relationship;
    a power unit;
    a capstan assembly for receiving and winding said pull line whereby the group of wires is threaded through the conduit;
    a driving connection between said power units and capstan assembly,
    rigid, non-flexing mounting means including a straight thrust member firmly uniting said capstan assembly to the end of the conduit through which generated load forces are transmitted from the capstan assembly to the conduit;
    a pulley assembly carried on the end of said mounting means immediately adjacent to the conduit end for directing said line rectilinearly from said capstan assembly into and out of the conduit without the line or group of wires contacting the end of the conduit and said line being substantially parallel to the thrust member,
    the path of generated load force transmission to the conduit via said mounting means being substantially parallel to said pull line extending between said pulley assembly and said capstan assembly.

2. Apparatus of the character described for threading cable through a rigid tube supported in adjacent structure comprising:
    a pull line engaged in gripping relationship to the group of wires;
    a power unit;
    a capstan assembly for drawing and winding said pull line whereby the group of wires is threaded through the tube;
    clutch mechanism operably coupled between said capstan assembly and said power unit for selectively supplying driving power to said capstan assembly;
    rigid, non-flexing mounting means including a straight line thrust member detachably and angularly adjustably connecting said capstan assembly to the extreme end of the tube for distributing load forces in the thrust member, produced in the threading operation, into the tube supporting structure;
    a pulley assembly carried on the end of said mounting mounting means immediately adjacent to the tube end for directing said pull line from said capstan assembly into and out of the tube without the line or group of wires contacting the end of the conduit; and said line being substantially parallel to the thrust member;
    a path of generated load force transmission to the tube via said mounting means being substantially parallel to said line extending between said pulley assembly and said capstan assembly.

3. The invention as defined in claim 1 wherein the mounting means includes detachable clamping means coupling the mounting means to an exposed end portion of the conduit.

4. The invention as defined in claim 1 wherein the mounting means includes an adapter mounted on the conduit and detachable clamping means coupling the mounting means to the adapter and normal thereto.

5. Apparatus for threading a bunched group of wires through a rigid conduit comprising:
    a pull wire engaged in gripping relationship with one end of the group of wires for aligning the wires in substantially parallel relationship;
    a power unit;
    a capstan assembly for receiving and winding said pull wire whereby the group of wires is threaded through the conduit;
    clutch mechanism disposed between said capstan assembly and said power unit for selectively supplying driving power to the capstan assembly;
    a rectilinear rigid thrust member including angularly adjustable clamping means for detachably coupling said capstan assembly to the extreme end of the conduit through which generated load forces are transmitted to the conduit; and
    a pulley having an axis of rotation parallel to the capstan assembly axis of rotation mounted on said rigid member immediately adjacent the conduit end over which said pull wire travels from the conduit to said capstan assembly, said pull wire being substantially parallel to the thrust member whereby the path of generated load forces transmitted through said rigid member is substantially parallel to said line extending between said pulley and said capstan assembly.

6. Apparatus of the character described for threading cable through a rigid conduit support in adjacent structure comprising:
    a pull wire engaged in gripping relationship with the group of wires;
    a capstan assembly for powered or manual drawing and winding of said pull wire whereby the group of wires is threaded through the conduit;
    a power unit operably coupled to said capstan assembly;
    a rectilinear rigid thrust member including angularly adjustable clamping means for coupling the capstan assembly to the end of the conduit for distributing load forces produced in the threading operation into the conduit supporting structure via the conduit; and
    a pulley mounted on said rigid thrust member adjacent the conduit over which said pull wire travels from the conduit to said capstan assembly, said pull wire being susbtantially parallel to the thrust member whereby the path of generated load forces transmitted through said rigid member is substantially parallel to said line extending between said pulley and said capstan assembly.

7. Apparatus of the character described for threading a group of wires through a conduit installed in adjacent surrounding supporting structure comprising:
- a pull wire engaged in gripping relationship with the group of wires;
- a capstan assembly for powered or manual drawing and winding of said pull wire whereby the group of wires is threaded through the conduit;
- said pull wire loosely engaged with said capstan assembly to permit manually controlled slippage of said pull wire about said capstan assembly;
- a movable power unit for supplying driving power to said capstan assembly;
- clutch mechanism operably coupled between said capstan assembly and said power unit for selectively supplying driving power to the capstan assembly;
- and an elongated rigid member connected to said capstan assembly and having a coupling for rigid connection with the conduit, said member reacting between the conduit and the capstan for distributing load forces produced in the threading operation onto the conduit.

8. Apparatus for threading a bunched group of wires through a rigid conduit comprising;
- a pull wire engaged in gripping relationship with one end of the group of wires for aligning the wires in substantially parallel relationship;
- a power unit;
- a capstan assembly for receiving and winding said pull wire whereby the group of wires is threaded through the conduit;
- clutch mechanism disposed between said capstan assembly and said power unit for selectively supplying driving power to the capstan assembly;
- a rectilinear rigid thrust member including pivotal clamping means for detachably coupling said capstan assembly to the extreme end of the conduit through which generated load forces are transmitted to the conduit;
- clamp means removably carried on said rigid member;
- a pulley having an axis of rotation parallel to the capstan assembly axis of rotation and mounted on said clamp means immediately adjacent the conduit and of a diameter to position the pull wire between the pulley and the conduit centrally of the conduit end over which said pull wire travels from the conduit to said capstan assembly said pull wire being substantially parallel to the thrust member; and
- the path of generated load forces transmitted through said rigid member being substantially parallel to said line extending between said pulley and said capstan assembly.

9. Apparatus for threading a bunched group of wires through a rigid conduit comprising;
- a pull wire engaged in gripping relationship with one end of the group of wires for aligning the wires in substantially parallel relationship;
- a power unit;
- a capstan assembly for receiving and winding said pull wire whereby the group of wires is threaded through the conduit;
- clutch mechanism disposed between said capstan assembly and said power unit for selectively supplying driving power to the capstan assembly;
- a rigid elongated thrust member for coupling said capstan assembly to the extreme end of the conduit through which generated load forces are transmitted to the conduit;
- clamping means pivotally secured on the end of said thrust member detachably connecting said thrust member to the conduit, said clamping means including a V-shaped receiver engageable with the conduit and a flexible strap adapted to be drawn about the conduit and secured to said receiver to fix said clamping means to the end of the conduit;
- and a pulley having an axis of rotation parallel to said capstan assembly axis of rotation and detachably mounted on the end of said rigid member immediately adjacent the conduit end over which said pull wire travels from the conduit to said capstan assembly, the path of generated load forces transmitted through said rigid member being parallel to said pull line extending between said pulley and said capstan assembly.

References Cited by the Examiner
UNITED STATES PATENTS

| | | | |
|---|---|---|---|
| 2,221,903 | 11/40 | Abramson et al. | 254—134.3 |
| 2,286,781 | 6/42 | Abramson et al. | |
| 2,729,424 | 1/56 | Eppensteiner. | |
| 3,072,382 | 1/63 | Jones | 254—134.3 |
| 3,072,383 | 1/63 | Vanderhagen | 254—134.3 |

WILLIAM FELDMAN, *Primary Examiner.*

MILTON S. MEHR, *Examiner.*